US007658179B2

(12) United States Patent
Bock et al.

(10) Patent No.: US 7,658,179 B2
(45) Date of Patent: Feb. 9, 2010

(54) FLUID LEAK LIMITER

(75) Inventors: Allyn P. Bock, Peachtree City, GA (US); Aaron Conrad Luft, Frankfort, IN (US); Benjamin Ray Tower, Varna, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 12/153,946

(22) Filed: May 28, 2008

(65) Prior Publication Data

US 2009/0295100 A1 Dec. 3, 2009

(51) Int. Cl.
*F02M 59/46* (2006.01)
*F16K 17/00* (2006.01)
*F02D 17/00* (2006.01)

(52) U.S. Cl. .............................. 123/467; 123/198 DB; 137/460

(58) Field of Classification Search ................. 123/467, 123/510, 198 D, 198 DB; 137/460, 517
See application file for complete search history.

(56) References Cited

U.S. PATENT DOCUMENTS

| | | | | |
|---|---|---|---|---|
| 4,539,959 | A * | 9/1985 | Williams | 123/456 |
| 4,589,393 | A * | 5/1986 | Jourde et al. | 123/460 |
| 4,798,186 | A | 1/1989 | Ganser | |
| 4,830,046 | A * | 5/1989 | Holt | 137/460 |
| 5,209,204 | A | 5/1993 | Bodenhausen et al. | |
| 5,215,113 | A * | 6/1993 | Terry | 137/460 |
| 5,462,081 | A * | 10/1995 | Perusek et al. | 137/498 |
| 5,511,528 | A * | 4/1996 | Iwanaga et al. | 123/467 |
| 5,577,479 | A * | 11/1996 | Popp | 123/458 |
| 5,613,518 | A * | 3/1997 | Rakieski | 137/513.5 |
| 5,692,476 | A * | 12/1997 | Egler et al. | 123/456 |
| 5,845,623 | A * | 12/1998 | Blizard et al. | 123/467 |
| 6,109,542 | A | 8/2000 | Morris et al. | |
| 6,293,254 | B1 | 9/2001 | Crofts et al. | |
| 6,302,333 | B1 | 10/2001 | Hoffmann et al. | |
| 6,314,936 | B1 | 11/2001 | Ångström | |
| 6,357,415 | B1 * | 3/2002 | Mori | 123/198 DB |
| 6,374,806 | B1 | 4/2002 | Keeley et al. | |
| 6,405,941 | B2 | 6/2002 | Ganser | |
| 6,595,238 | B2 * | 7/2003 | De Matthaeis | 137/539 |
| 6,668,802 | B2 * | 12/2003 | Kiowsky et al. | 123/467 |
| 6,705,292 | B2 | 3/2004 | Bugos | |
| 6,805,302 | B2 | 10/2004 | Boecking | |
| 6,830,034 | B2 * | 12/2004 | Engelmeyer et al. | 123/470 |
| 6,953,052 | B2 * | 10/2005 | Lehtonen | 137/517 |
| 7,028,918 | B2 | 4/2006 | Buchanan et al. | |

(Continued)

*Primary Examiner*—Thomas N Moulis
(74) *Attorney, Agent, or Firm*—Finnegan, Henderson, Farabow, Garrett & Dunner; Carl E. Myers

(57) ABSTRACT

A fluid leak limiter for a high-pressure fuel injection system is disclosed. The fluid leak limiter may have a body at least partially defining a central bore with a fluid inlet and a fluid outlet, and a sleeve piston. The fluid leak limiter may also have a spring located to bias the sleeve piston toward a first flow-blocking position. The sleeve piston may be movable by a first pressure differential between the fluid inlet and the fluid outlet against the bias of the spring toward a flow-passing position at which fluid from the fluid inlet is allowed to flow to the fluid outlet. The sleeve piston may also be movable by a second pressure differential between the fluid inlet and the fluid outlet against the bias of the spring toward a second flow-blocking position at which fluid from the fluid inlet is inhibited from flowing to the fluid outlet.

19 Claims, 2 Drawing Sheets

U.S. PATENT DOCUMENTS

| | | | | |
|---|---|---|---|---|
| 7,140,386 | B2 * | 11/2006 | Avis et al. | 137/504 |
| 7,258,131 | B2 * | 8/2007 | Eichler | 137/460 |
| 7,309,027 | B2 | 12/2007 | Magel et al. | |
| 7,428,893 | B2 * | 9/2008 | Shinogle et al. | 123/481 |
| 2003/0183200 | A1 | 10/2003 | Bugos | |
| 2006/0191515 | A1 | 8/2006 | Savage, Jr. et al. | |
| 2007/0169751 | A1 | 7/2007 | Tominaga et al. | |

* cited by examiner

FLUID LEAK LIMITER

TECHNICAL FIELD

The present disclosure is directed to a fluid leak limiter and, more particularly, to a fluid leak limiter for use with a high-pressure fuel injection system.

BACKGROUND

High-pressure fuel injection systems typically employ closed-nozzle fuel injectors to inject high-pressure fuel into the combustion chambers of an engine. Each of these fuel injectors includes a nozzle member having a cylindrical bore with a nozzle supply passageway and a nozzle outlet. A needle check valve is reciprocatingly disposed within the cylindrical bore and biased toward a closed position at which the nozzle outlet is blocked. In response to an injection request, the needle check valve is selectively moved to open the nozzle outlet, thereby allowing high-pressure fuel to flow from the nozzle supply passageway into an associated combustion chamber.

During operation of the fuel injector, it may be possible for a tip portion of the nozzle member to crack, erode, or completely break away, leaving the nozzle outlet continuously open to some degree. In order to ensure the high-pressure fuel is not constantly pumped into the combustion chamber of the engine, some high-pressure fuel injection systems employ a leak limiter to limit fuel leakage through the nozzle member during an injector failure.

Existing leak limiters are configured to block fuel flow to the tip portion of a leaking injector after failure of the injector. Although effective, upon shutdown of the engine, existing leak limiters reset and, during restart of the engine, fuel is once again continuously pumped through the leaking injector into the combustion chamber. In some instances, the leakage could be so significant that pressure cannot build within the fuel system during restart, thereby inhibiting further operation of the engine. If unaccounted for, this situation could leave a machine stranded and/or inhibit diagnosis of the leaking injector.

One leak limiter configured to permanently inhibit fuel leakage through a failed injector is described in U.S. Patent Publication No. 2006/0191515 (the '515 publication) by Savage, Jr. et al. published Aug. 31, 2006. The '515 publication discloses a fuel injector having a needle valve member disposed within and supported by a tip portion of a nozzle member. During normal operation, the needle valve member is moved away from the tip portion of the nozzle member to allow pressurized fuel to exit the fuel injector by way of a nozzle outlet located at the tip portion. Upon breakage of the tip portion, the needle valve member is no longer supported and descends into the nozzle member under the bias of a spring until an outer conical seating surface of the needle valve member engages an inner conical seating surface of the nozzle member, thereby isolating the outlet at the tip portion from pressurized fuel. Geometry of the needle valve member inhibits further movement that would re-communicate the outlet at the tip portion of the nozzle member with the pressurized fuel, even during subsequent intentional injection events and during engine restart.

Although the leak limiter of the '515 patent may permanently inhibit fuel leakage of a failed injector after the tip end of the nozzle member has broken away, it may still be sub-optimal. That is, during some fuel injector failure modes, for example cracking or erosion, the tip portion may not break away enough for the needle check valve to sufficiently descend and completely block undesired fuel leakage through the nozzle member. In these situations, some fuel leakage may still occur.

The fuel leak limiter of the present disclosure solves one or more of the problems set forth above and/or other problems of the prior art.

SUMMARY

One aspect of the present disclosure is directed to a fluid leak limiter. The fluid leak limiter may include a body at least partially defining a central bore and having a fluid inlet and a fluid outlet, and a sleeve piston reciprocatingly disposed within the central bore. The fluid leak limiter may also include a spring located to bias the sleeve piston toward a first flow-blocking position, at which fluid from the fluid inlet is inhibited from flowing to the fluid outlet. The sleeve piston may be movable by a first pressure differential between the fluid inlet and the fluid outlet against the bias of the spring toward a flow-passing position, at which fluid from the fluid inlet is allowed to flow to the fluid outlet. The sleeve piston may also be movable by a second pressure differential between the fluid inlet and the fluid outlet against the bias of the spring toward a second flow-blocking position, at which fluid from the fluid inlet is inhibited from flowing to the fluid outlet.

Another aspect of the present disclosure is directed to another leak limiter. This leak limiter may include a body at least partially defining a central bore and having a fluid inlet and a fluid outlet, and a sleeve piston reciprocatingly disposed within the central bore and configured to selectively inhibit a flow of fluid from the fluid inlet to the fluid outlet. The leak limiter may also include a spring configured to bias the sleeve piston relative to the body, and a locking collar operatively connected to the body. The locking collar may be configured to selectively engage the sleeve piston when the flow of fluid is inhibited and to resist disengagement of the sleeve piston from the locking collar.

In yet another aspect, the present disclosure is directed to a fuel system. The fuel system may include a pump configured to pressurize fuel, and a fuel injector configured to receive pressurized fuel from the pump. The fuel system may also include a leak limiter situated between the pump and the fuel injector. The leak limiter may be configured to inhibit fuel flow from the pump to the fuel injector after the fuel injector has been compromised.

DETAILED DESCRIPTION

Figure 1:
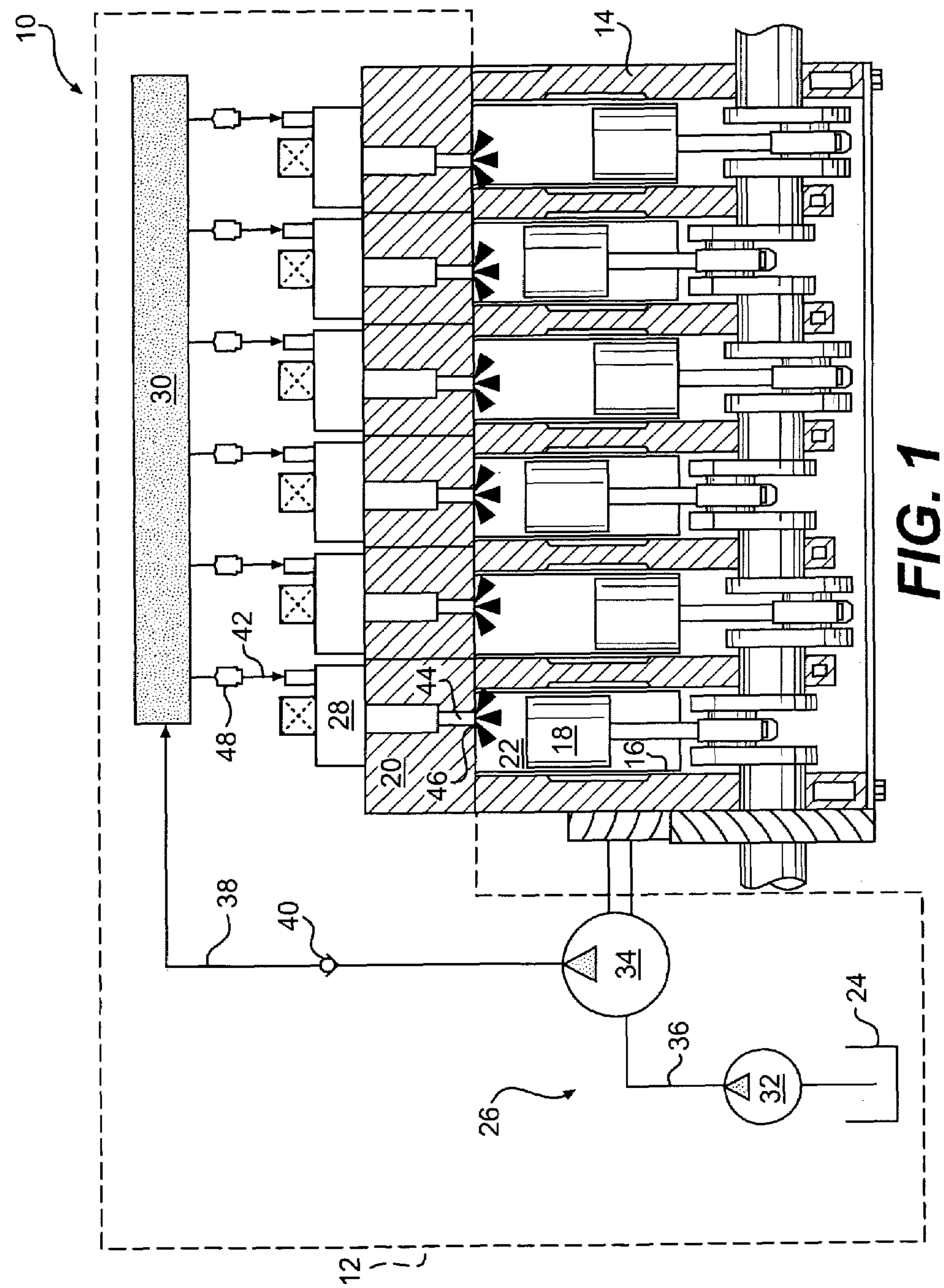
FIG. 1 is a schematic and diagrammatic illustration of an exemplary disclosed power system.

An exemplary embodiment of an engine 10 having a fuel system 12 is illustrated in FIG. 1. For the purposes of this disclosure, engine 10 is depicted and described as a four-stroke diesel engine. One skilled in the art will recognize, however, that engine 10 may be any other type of internal combustion engine such as, for example, a gasoline or a gaseous fuel-powered engine. Engine 10 may include an engine block 14 that defines a plurality of cylinders 16, a piston 18 slidably disposed within each cylinder 16, and a cylinder head 20 associated with each cylinder 16. Cylinder 16, piston 18, and cylinder head 20 may together form a combustion chamber 22. In the illustrated embodiment, engine 10 includes six combustion chambers 22. However, it is contemplated that engine 10 may include a greater or lesser number of combustion chambers 22 and that combustion chambers 22 may be disposed in an "in-line" configuration, a "V" configuration, or any other suitable configuration.

Fuel system 12 may include components that cooperate to deliver injections of pressurized fuel into each combustion chamber 22. Specifically, fuel system 12 may include a tank 24 configured to hold a supply of fuel, and a fuel pumping arrangement 26 configured to pressurize the fuel and direct the pressurized fuel to a plurality of fuel injectors 28 by way of a common manifold 30. It is contemplated, however, that in some embodiment, manifold 30 may be omitted or integral with fuel pumping arrangement 26, if desired.

Fuel pumping arrangement 26 may include one or more pumping devices that function to increase the pressure of the fuel and direct one or more pressurized streams of fuel to manifold 30. In one example, fuel pumping arrangement 26 includes a low pressure source 32 and a high-pressure source 34 disposed in series and fluidly connected by way of a fuel line 36. Low pressure source 32 may be a transfer pump configured to provide low pressure feed to high-pressure source 34. High-pressure source 34 may be configured to receive the low pressure feed and to increase the pressure of the fuel to, in some embodiments, about 330 MPa. High-pressure source 34 may be connected to manifold 30 by way of a fuel line 38. A check valve 40 may be disposed within fuel line 38 to provide for a unidirectional flow of fuel from fuel pumping arrangement 26 to manifold 30.

Fuel injectors 28 may be disposed within cylinder heads 20 and connected to manifold 30 by way of a plurality of fuel lines 42. Each fuel injector 28 may be operable to inject an amount of pressurized fuel into an associated combustion chamber 22 at predetermined timings, fuel pressures, and fuel flow rates. Fuel injectors 28 may be hydraulically, mechanically, electrically, or pneumatically operated.

Each fuel injector 28 may be a closed nozzle unit fuel injector having a nozzle member 44. Nozzle member 44 may embody a generally cylindrical member configured to receive a needle valve (not shown). One or more orifices 46 may be located at tip end of nozzle member 44 and selectively blocked and unblocked by the needle valve to allow injections of pressurized fuel into combustion chamber 22.

In some situations, it may be possible for a portion of nozzle member 44 to erode, crack, or completely break away. In order to inhibit unchecked fuel leakage from the damaged nozzle member 44 into combustion chamber 22, a fluid leak limiter 48 may be fluidly disposed between manifold 30 and each fuel injector 28. In one embodiment, fluid leak limiter 48 may be directly connected to manifold 30 by threaded fastening (not shown), and indirectly connected to fuel injector 28 by way of a quill tube (not shown).

Fluid leak limiter 48 may be configured to inhibit fuel flow to a leaking fuel injector 28 in response to a pressure differential between manifold 30 and the leaking fuel injector 28. That is, when nozzle member 44 is compromised (e.g., fails), the fuel within the compromised fuel injector 28 may flow substantially unimpeded into the associated combustion chamber 22. As a result of this decreased restriction to flow within the compromised fuel injector 28, the pressure of the fuel within the compromised fuel injector 28 may quickly be reduced by a significant amount. And, the difference in pressure between manifold 30 and the compromised fuel injector 28 may be much greater than the difference in pressure between manifold 30 and a properly functioning fuel injector 28. This increased pressure difference, as will be described in more detail below, may cause fluid leak limiter 48 to actuate and inhibit fuel flow to the compromised fuel injector 28. Once fluid leak limiter 48 has actuated, fuel flow through fluid leak limiter 48 may be permanently inhibited. That is, fluid leak limiter 48 may be a latching-type limiter, wherein fuel flow therethrough may be inhibited until service has been performed.

Figure 2:
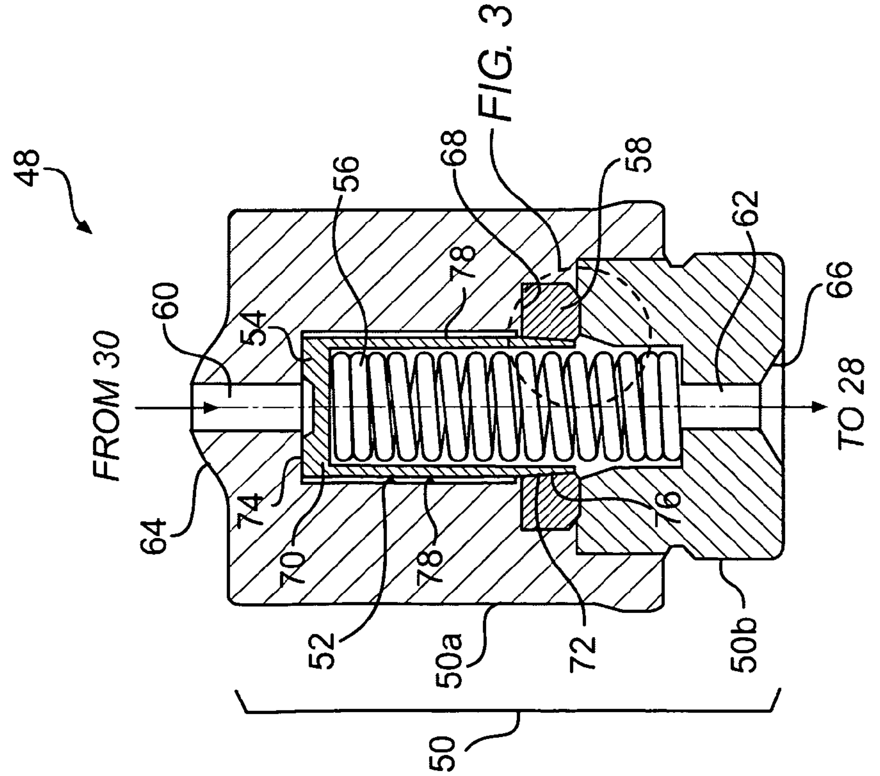
FIG. 2 is a cross-sectional illustration of an exemplary disclosed fuel leak limiter that may be used with the power system of FIG. 1.

As illustrated in FIG. 2, fluid leak limiter 48 may include multiple components that cooperate to selectively pass or block fuel flow in response to a pressure differential. Specifically, fluid leak limiter 48 may include a body member 50 that at least partially encloses a central bore 52, a sleeve piston 54 reciprocatingly disposed within central bore 52 and biased toward a first flow-blocking position (shown in FIG. 2) by a spring 56, and a locking collar 58 that engages sleeve piston 54 in a second flow-blocking position (shown in FIG. 3).

Body member 50 may be a two-piece body member having a fluid inlet 60 and a fluid outlet 62. In particular, body member 50 may include a first body piece 50*a* and a second body piece 50*b* threadingly received within an open end of first body piece 50*a*. First body piece 50*a* may have a male sealing surface 64 configured to engage a female sealing surface (not shown) of manifold 30, while second body piece 50*b* may have a female sealing surface 66 configured to receive the quill tube referenced above. Fluid inlet 60 may be disposed within first body piece 50*a* in axial alignment and fluid communication with central bore 52. Fluid outlet 62 may be disposed within second body piece 50*b* in axial alignment and fluid communication with central bore 52. A recess 68 may be located within second body piece 50*b* at an interface of first and second body pieces 50*a*, 50*b* to receive locking collar 58 such that, when first and second body pieces 50*a*, 50*b* are joined together, locking collar 58 may be sufficiently retained within body member 50 (i.e., locking collar 58 may be sandwiched by first and second body pieces 50*a*, 50*b*).

Figure 3:
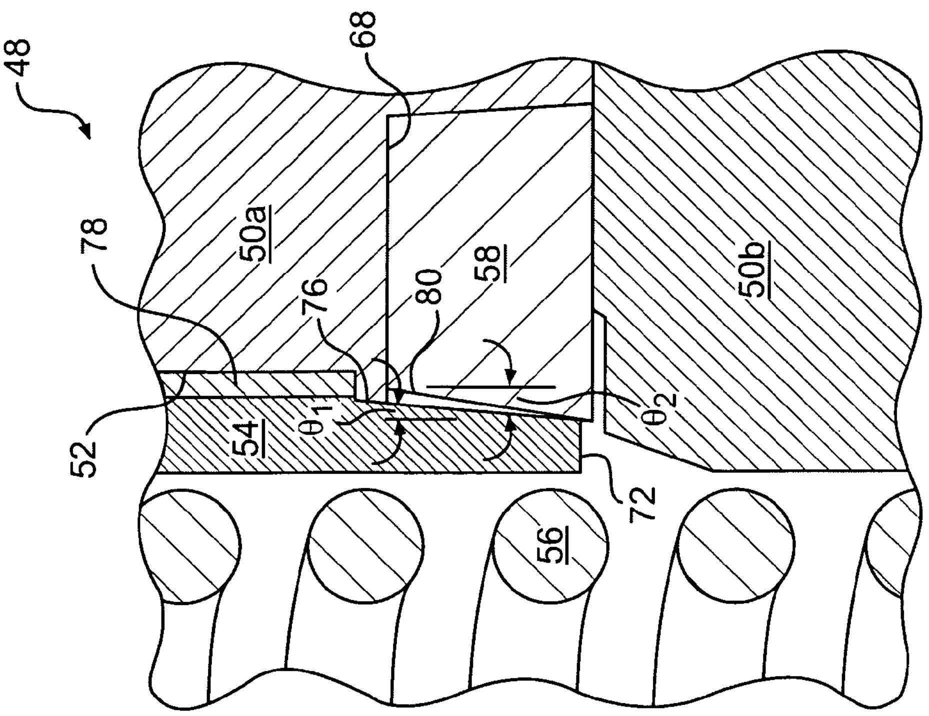
FIG. 3 is a cross-sectional illustration of a portion of the fuel leak limiter shown in FIG. 2.

Sleeve piston 54 may have a generally cup-like shape, with a closed end 70 and an opposing open end 72. A first sealing surface 74 may be located at closed end 70 and configured to engage an end surface of central bore 52 to selectively inhibit a flow of fuel from fluid inlet 60 to central bore 52 when sleeve piston 54 is in the first flow-blocking position. A second sealing surface 76 may be located at open end 72 and configured to engage an internal surface of locking collar 58 to selectively inhibit a flow of fuel from central bore 52 to fluid outlet 62 when sleeve piston 54 is in the second flow-blocking position. As illustrated in FIG. 3 (FIG. 3 is an enlarged image of the area of FIG. 2 contained within the dashed circle), second sealing surface 76 may be chamfered relative to a central axis of sleeve piston 54, and have a chamfer angle $\theta_1$ of about 3°. One or more grooves 78 may be located in an outer surface of sleeve piston 54 and axially extend from about first sealing surface 74 to about second sealing surface 76 to facilitate a flow of fuel from fluid inlet 60 to fluid outlet 62 when sleeve piston 54 is in a flow-passing position. The flow-passing position may be between the first and second flow-blocking positions, where first sealing surface 74 is away from the end surface of central bore 52 and second sealing surface 76 is disengaged from locking collar 58.

Spring 56 may include a first end located within second body piece 50*b*, and a second end located within sleeve piston 54 to bias first sealing surface 74 against the end of central bore 52, thereby blocking the flow of fuel from fluid inlet 60 into central bore 52. As fuel from fluid inlet 60 presses against closed end 70 of sleeve piston 54 and fuel from within central bore 52 is consumed by an associated fuel injector 28, a pressure differential across sleeve piston 54 may cause spring 56 to compress. And, as spring 56 compresses, sleeve piston 54 may be allowed to move away from the first flow-blocking position toward the flow-passing position. In the flow passing position, pressurized fuel from within manifold 30 may be allowed to flow substantially unimpeded through fluid leak limiter 48 by way of grooves 78 to fuel injector 28. However, in the event of an injector failure, the pressure of the fuel within fuel injector 28, fluid outlet 62, and central bore 52 may drop significantly, thereby greatly increasing the pressure differential across sleeve piston 54. And, as the pressure differential across sleeve piston 54 increases, spring 56 may continue to compress until sleeve piston 54 moves far enough toward second body piece 50*b* that second sealing surface 76 engages locking collar 58 in the second flow-blocking position.

Locking collar 58 may be configured to engage sleeve piston 54 in the second flow-blocking position and maintain sleeve piston 54 in the second flow-blocking position until service of fluid leak limiter 48 has been performed. Specifically, locking collar 58 may include a female sealing surface 80 chamfered relative to a central axis of locking collar 58 and having a chamfer angle $\theta_2$ of about 3.5°. The chamfer of female sealing surface 80 may be such that when sleeve piston 54 is in the second flow-blocking position, a mechanical interference may be created that maintains sleeve piston 54 in that position. And, regardless of a subsequent change in the pressure differential across sleeve piston 54, this mechanical interference may be sufficient to constrain further movement of sleeve piston 54. As such, after engagement of sleeve piston 54 with locking collar 58 (i.e., after fluid leak limiter 48 has been triggered to inhibit fluid flow), fluid leak limiter 48 may need to be replaced in its entirety, or sleeve piston 54 and locking collar 58 replaced or mechanically disengaged.

INDUSTRIAL APPLICABILITY

The fluid leak limiter of the present disclosure has wide application in a variety of engine types including, for example, diesel engines, gasoline engines, and gaseous fuel-powered engines. The disclosed fluid leak limiter may be implemented into any engine that utilizes a pressurizing fuel system having closed orifice-type fuel injectors where limitation of fuel leakage into associated combustion chambers after nozzle tip failure is desired.

Numerous advantages of the disclosed fluid leak limiter may be realized. For example, the disclosed fluid leak limiter may be capable of inhibiting fluid leakage caused by a variety of failure modes. That is, regardless of whether an associated fuel injector is leaking because of nozzle cracking, erosion, or complete breakaway, the disclosed fluid leak limiter may still function to block and thereby inhibit fuel leakage.

It will be apparent to those skilled in the art that various modifications and variations can be made to the fluid leak limiter of the present disclosure without departing from the scope of the disclosure. Other embodiments will be apparent to those skilled in the art from consideration of the specification and practice of the fluid leak limiter disclosed herein. For example, although described and illustrated for use with a high-pressure fuel system, it is contemplated that the disclosed fluid leak limiter may be used with other high-pressure fluid systems, if desired. It is intended that the specification and examples be considered as exemplary only, with a true scope of the invention being indicated by the following claims and their equivalents.

What is claimed is:

1. A fluid leak limiter, comprising:

a body at least partially defining a central bore and having a fluid inlet and a fluid outlet;

a sleeve piston reciprocatingly disposed within the central bore; and a spring located to bias the sleeve piston toward a first flow-blocking position at which fluid from the fluid inlet is inhibited from flowing to the fluid outlet, wherein:

the sleeve piston is movable by a first pressure differential between the fluid inlet and the fluid outlet against the bias of the spring toward a flow-passing position at which fluid from the fluid inlet is allowed to flow to the fluid outlet; and the sleeve piston is movable by a second pressure differential between the fluid inlet and the fluid outlet against the bias of the spring toward a second flow-blocking position at which fluid from the fluid inlet is inhibited from flowing to the fluid outlet.

2. The fluid leak limiter of claim 1, wherein each of the first and second pressure differentials is associated with a pressure at the fluid inlet exceeding a pressure at the fluid outlet.

3. The fluid leak limiter of claim 2, wherein the second pressure differential is greater than the first pressure differential.

4. The fluid leak limiter of claim 1, wherein the flow passing position is between the first and second flow-blocking positions.

5. The fluid leak limiter of claim 1, further including a locking collar operatively connected to the body and configured to engage the sleeve piston in the second flow-blocking position.

6. The fluid leak limiter of claim 5, wherein an engagement of the locking collar with the sleeve piston creates an interference that resists disengagement.

7. The fluid leak limiter of claim 6, wherein the locking collar includes a female sealing surface that receives a male sealing surface of the sleeve piston.

8. The fluid leak limiter of claim 7, wherein the female sealing surface has a chamfer angle of about 3.5°, and the male sealing surface has a chamfer angle of about 3°.

9. The fluid leak limiter of claim 1, where the sleeve piston has at least one externally located groove that facilitates passage of the fluid from the fluid inlet to the fluid outlet when the sleeve piston is in the flow-passing position.

10. The fluid leak limiter of claim 1, wherein the body is a two piece member.

11. The fluid leak limiter of claim 1, wherein the sleeve piston includes a closed end having a first sealing surface associated with the fluid inlet, and an open end having a second sealing surface associated with the fluid outlet.

12. A fluid leak limiter, comprising:

a body at least partially defining a central bore and having a fluid inlet and a fluid outlet;

a sleeve piston reciprocatingly disposed within the central bore and configured to selectively inhibit a flow of fluid from the fluid inlet to the fluid outlet;

a spring configured to bias the sleeve piston relative to the body; and a locking collar operatively connected to the body and configured to selectively engage the sleeve piston when the flow of fluid is inhibited and to resist disengagement of the sleeve piston from the locking collar.

13. The fluid leak limiter of claim 12, wherein the locking collar includes a female sealing surface that interferes with a male sealing surface of the sleeve piston when the locking collar is engaged with the sleeve piston.

14. The fluid leak limiter of claim 13, wherein the female sealing surface has a chamfer angle of about 3.5° and the male sealing surface has a chamfer angle of about 3°.

15. The fluid leak limiter of claim 12, where the sleeve piston has at least one externally located groove that facilitates passage of the fluid from the fluid inlet to the fluid outlet when the sleeve piston is in the flow-passing position.

16. The fluid leak limiter of claim 12, wherein:

the body includes a first member and a second member received within the first member to substantially enclose the sleeve piston; and the first member includes a recess configured to receive the locking collar.

17. The fluid leak limiter of claim 12, wherein the sleeve piston includes a closed end having a first sealing surface associated with the fluid inlet, and an open end having a second sealing surface associated with the fluid outlet.

18. A fuel system, comprising:

a pump configured to pressurize fuel;

a fuel injector configured to receive pressurized fuel from a manifold; and a leak limiter situated between the pump and the fuel injector, the leak limiter configured to inhibit fuel flow from the pump to the fuel injector after the fuel injector has been compromised; and wherein the leak limiter is triggered to inhibit fuel flow based on a pressure differential between the pump and the fuel injector, and the leak limiter is maintained in a fuel flow inhibiting condition by a mechanical interference after triggering.

19. The fuel system of claim 18, wherein the leak limiter is a latching leak limiter and configured to continuously inhibit fuel flow to the leak limiter after the fuel injector has been compromised until service of the leak limiter has been performed.

* * * * *